United States Patent
Alexander et al.

(10) Patent No.: US 8,006,934 B2
(45) Date of Patent: Aug. 30, 2011

(54) HEATING ARCHITECTURE FOR A COMPOSITE FAIRING

(75) Inventors: Phillip Alexander, Colchester, CT (US); David R. Lyders, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 679 days.

(21) Appl. No.: 12/080,051

(22) Filed: Mar. 31, 2008

(65) Prior Publication Data

US 2009/0242703 A1 Oct. 1, 2009

(51) Int. Cl.
*B64D 15/12* (2006.01)

(52) U.S. Cl. ............ 244/134 D; 219/526

(58) Field of Classification Search ......... 244/134 R, 244/134 D; 219/526, 528, 444.1
See application file for complete search history.

(56) References Cited

U.S. PATENT DOCUMENTS

| | | | |
|---|---|---|---|
| 2,762,897 A * | 9/1956 | Vrooman et al. ............ 219/526 |
| 3,178,560 A * | 4/1965 | Mapp et al. ................ 219/528 |
| 3,204,084 A * | 8/1965 | Spencer, Jr. et al. ...... 244/134 D |
| 4,737,618 A | 4/1988 | Barbier et al. |
| 4,942,078 A | 7/1990 | Newman et al. |
| 5,281,091 A | 1/1994 | Dooley et al. |
| 5,351,918 A | 10/1994 | Giamati et al. |
| 5,487,218 A * | 1/1996 | Bhatt et al. .................. 29/852 |
| 5,657,951 A | 8/1997 | Giamati |
| 5,934,617 A | 8/1999 | Rutherford |
| 6,194,685 B1 | 2/2001 | Rutherford |
| 6,423,905 B1 * | 7/2002 | Brodsky et al. ............ 174/256 |
| 6,725,645 B1 | 4/2004 | Wadia et al. |
| 7,145,231 B2 * | 12/2006 | Hasebe et al. ............. 257/712 |
| 7,157,663 B1 | 1/2007 | Kismarton |
| 7,230,205 B2 | 6/2007 | Twerdochlib |
| 7,246,773 B2 | 7/2007 | Stoner et al. |
| 7,291,815 B2 | 11/2007 | Hubert et al. |
| 2005/0006529 A1 | 1/2005 | Moe et al. |
| 2005/0023270 A1 * | 2/2005 | Hiramatsu et al. ......... 219/444.1 |
| 2006/0237590 A1 | 10/2006 | Layland et al. |
| 2007/0102582 A1 | 5/2007 | Botura et al. |
| 2007/0187381 A1 | 8/2007 | Vontell, Sr. et al. |

* cited by examiner

*Primary Examiner* — Galen Barefoot
(74) *Attorney, Agent, or Firm* — Kinney & Lange, P.A.

(57) ABSTRACT

A composite fairing with embedded heating architecture for ice protection includes heating elements arranged on various fairing plies for heating substantially all of the composite fairing. The heating elements are positioned to provide ice protection to substantial portions of the external surface of the composite fairing. Junctions, busbars, and plated through holes are used for delivering electric current to the heating elements on the various fairing plies.

20 Claims, 8 Drawing Sheets

HEATING ARCHITECTURE FOR A COMPOSITE FAIRING

STATEMENT OF GOVERNMENT INTEREST

The U.S. Government has a paid-up license in this invention and the right in limited circumstances to require the patent owner to license others on reasonable terms as provided for by the terms of Contract No. N00019-02-C-3003 awarded by the United States Navy.

BACKGROUND

Operation of aircraft engines in adverse weather conditions or at high altitudes can sometimes lead to ice forming on the exposed surfaces of engine inlets. The build-up of ice on engine inlet surfaces limits the quantity of air being fed to the engine. This reduction in inlet airflow can result in a reduction of power output and efficiency of the engine. Systems used to prevent or remove ice formation on aircraft nose cones and wing leading edges are well known. Engine inlet anti-icing systems are also used and commonly employ a thermal source, such as hot air bled from the engine core, which is applied to the engine inlet to melt or evaporate ice build-up on the external surfaces thereof. However, hot air bled from the engine core reduces overall engine performance.

Electrothermal devices have also been used to prevent ice formation and remove ice from aircraft. Commonly employed electrothermal deicers use heating elements that are mounted on a flexible backing. These heating elements can then be attached to aircraft structures with an adhesive. Coatings containing heating elements have also been used. Previous structures employing heating elements in coatings have compromised the strength and integrity of the structures, however. Electrical components in these structures may be encapsulated by an insulating layer, such as Kapton. These insulating layers typically do not bond well within a structure and reduce the strength of the structure because they take up space that could be used for means of strengthening the structure.

Thus, there exists a need for engine inlet components with anti-icing features that do not sacrifice structural integrity for anti-icing capabilities.

SUMMARY

An exemplary embodiment of the present invention is a composite fairing with ice protection having a plurality of plies. The composite fairing includes at least one heating element configured to heat a first zone of the fairing, a second heating element configured to heat a second zone of the fairing, a plated through hole extending through all fairing plies, pluralities of junctions and junction busbars for conducting electric current to the first heating element and to the plated through hole, and at least one busbar for conducting electric current from the plated through holes to the second heating element.

In another exemplary embodiment of the present invention, a composite fairing with ice protection and a plurality of plies includes first, second, and third heating elements configured to heat separate zones of the fairing, plated through holes extending through all fairing plies, pluralities of junctions and busbars for conducting electric current to the first heating element and to the plated through holes, and busbars for conducting electric current from the plated through holes to the second and third heating elements.

Another exemplary embodiment is a composite fairing with ice protection having a plurality of plies, including first and second plies. The first ply includes a first heating element, a plated through hole for conducting electric current to other fairing plies, and pluralities of junctions and busbars for conducting electric current to the first heating element and to the plated through hole. The second ply includes a second heating element, the plated through hole of the first ply, and a busbar for conducting electric current from the plated through hole to the second heating element.

Further exemplary embodiments include a method of making a composite fairing with embedded heating elements and having ice protection. The method includes depositing a first heating element on an inner surface of a first fairing ply, providing junctions and busbars on the inner surface of the first ply for conducting electric current to the first heating element, and providing a through hole area. The method also includes depositing a second heating elements on an inner surface of a second ply, providing a through hole area, and providing busbars on the inner surface of the second ply for conducting electric current from the through hole area to the second heating element. The method further involves shaping the plies of the composite fairing to their desired configuration, co-molding the plies together to form the composite fairing, drilling at least one through hole extending through all plies of the composite fairing in the through hole area, and electro-plating the through hole to form a plated through hole.

DETAILED DESCRIPTION

The present invention relates to an improved architecture for embedded heating elements in a composite fairing that provides the fairing with ice protection while maintaining the integrity of the composite fairing compared to currently available fairings with ice protection capabilities. Previous composite fairings with embedded heating elements employed materials, such as Kapton (polyimide), to encapsulate return circuits for the heating elements. Return circuits were encapsulated because they overlapped the heating elements within a fairing ply and needed to be insulated from the heating elements to function as return circuits. The use of Kapton and similar materials resulted in less efficient bonding of fairing plies. Layers of Kapton also occupied space within the plies of the fairing, negatively affecting the strength of the fairing. A Kapton layer is generally about 0.001 inches (0.04 mm) thick. Return circuits encapsulated in Kapton generally took up about 0.004 inches (0.16 mm) of a fairing ply. Generally, a fairing ply is about 0.009 inches (0.23 mm) thick. Thus, the return circuit and Kapton layers occupied approximately half of the fairing ply thickness.

The present invention eliminates the need for Kapton layers within the composite fairing while still offering ice protection. The present invention provides heating elements and return circuits in a non-overlapping configuration on the same fairing ply. With this configuration it is possible to provide ice protection for substantially all of the composite fairing by using ice-protection heating elements at various depths of the fairing. This configuration allows the heating elements to prevent or reduce ice-formation while maintaining the integrity to the composite fairing.

Figure 1:
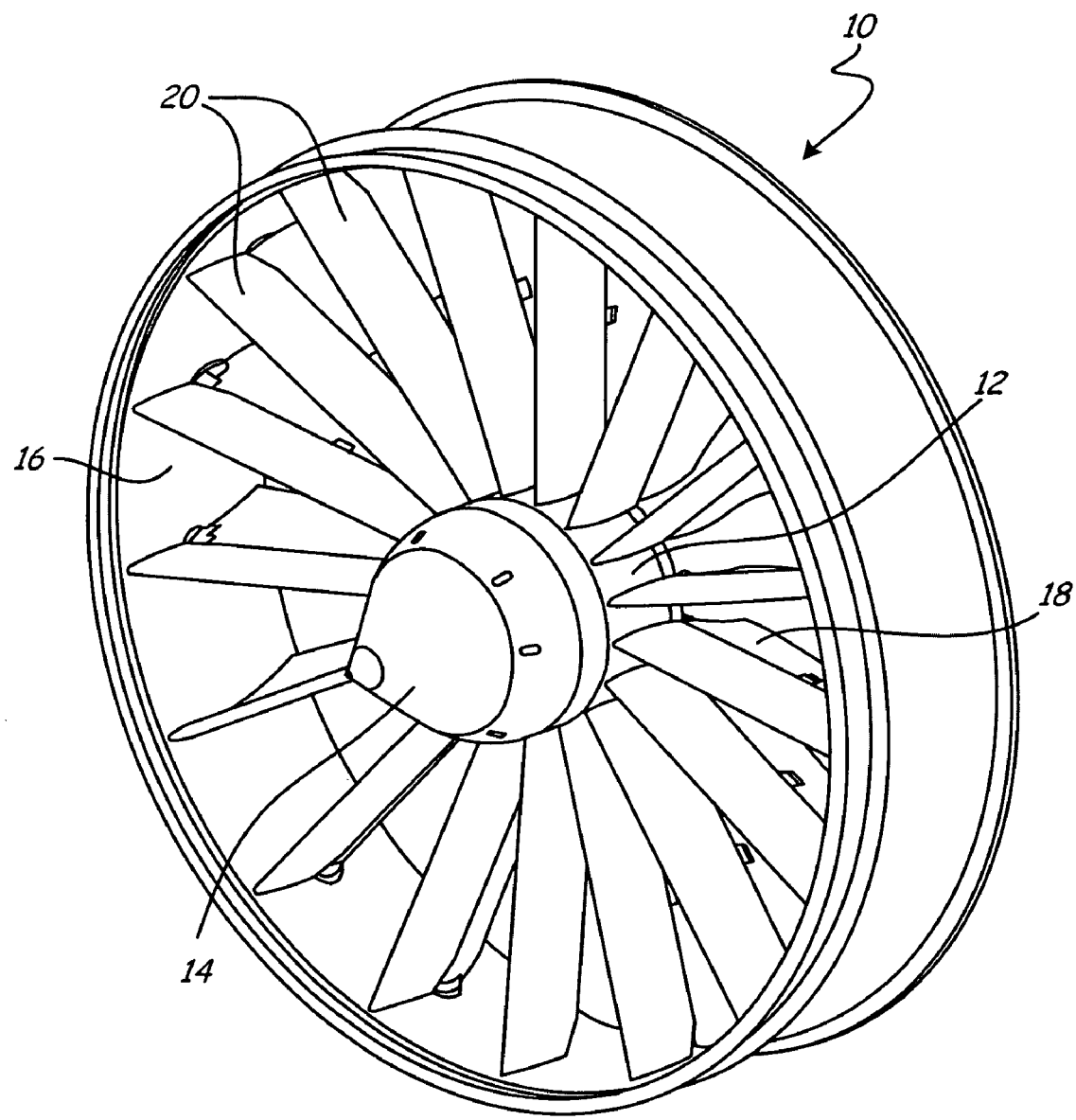
FIG. 1 is a perspective view of an engine inlet.

FIG. 1 shows an engine inlet 10 having composite fairings 20 with the embedded heating architecture of the present invention. Within the engine inlet 10 are an inner ring 12, a nosecone 14, an outer ring 16, a plurality of inner struts (not shown) extending from the inner ring 12 to the outer ring 16 and a plurality of composite fairings 20 surrounding the inner struts. The nosecone 14 is located at an upstream side of the engine inlet. The fairings 20 are located downstream from the nosecone 14, and they surround and are bonded to the inner struts. Variable vanes 18 are located downstream of the fairings 20 and inner struts. While FIG. 1 depicts seventeen fairings 20 within the engine inlet, the number of inner struts and fairings present in the engine inlet is not limited to this illustration. Configurations with fewer or greater numbers of fairings and inner struts within the engine inlet are possible.

Each composite fairing 20 is made up of several layers, or plies, of material. Lightweight and sturdy materials, such as fiberglass, generally constitute a large part of the several layers of the composite fairing. In one exemplary embodiment, a composite fairing will have ten layers, or plies. Fairings according to the present invention may also have fewer or a greater number of plies, however. Composite fairings according to the present invention may have eight plies or fewer or twelve plies or more. Generally, a single fairing ply is about 0.009 inches (0.23 mm) thick.

Figure 2:
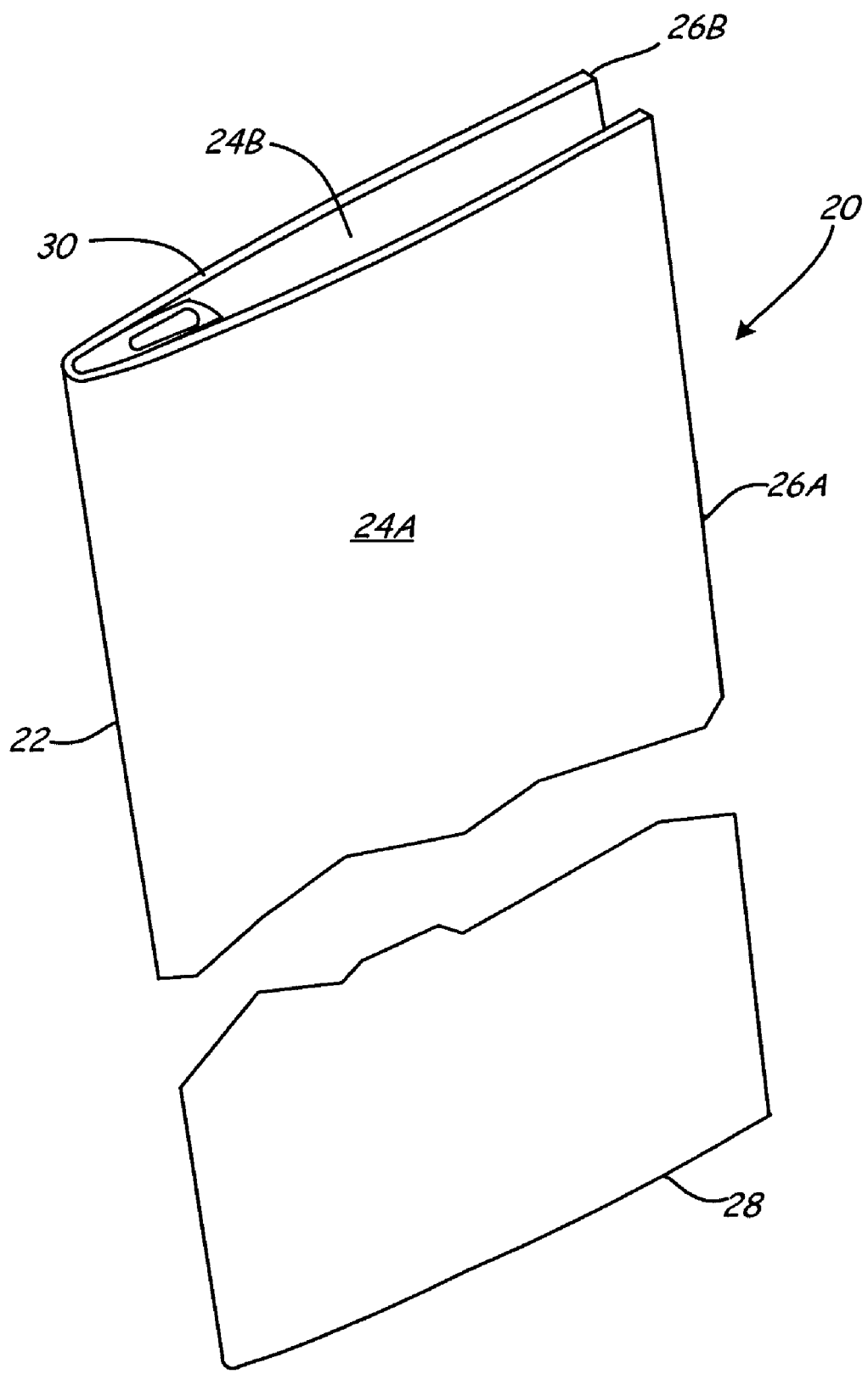
FIG. 2 is a perspective view of a composite fairing in accordance with one embodiment of the present invention.

One embodiment of a composite fairing 20 according to the present invention is shown in FIG. 2. The fairing 20 has an upstream end 22, downstream sides 24A, 24B, and downstream ends 26A, 26B. The fairing is bonded to an inner strut (not shown) along the inner surfaces of the downstream sides 24A, 24B. The inner struts extend radially from the inner ring 12 of the engine inlet to the outer ring 16. The fairing 20 extends substantially the length of an inner strut so that an inner end 28 of the fairing is near the inner ring of the engine inlet and an outer end 30 is near the outer ring of the engine inlet.

Figure 3A:
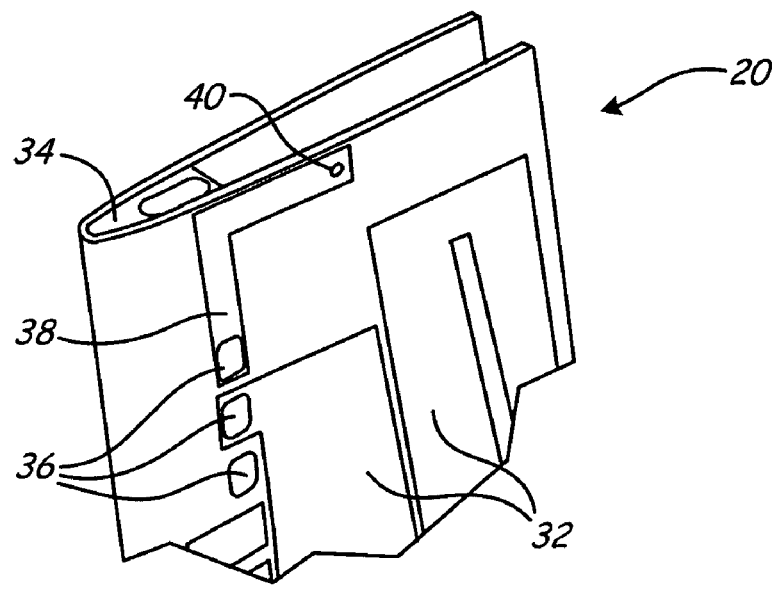
FIG. 3A is a detailed view of one ply of a composite fairing.
Figure 3B:
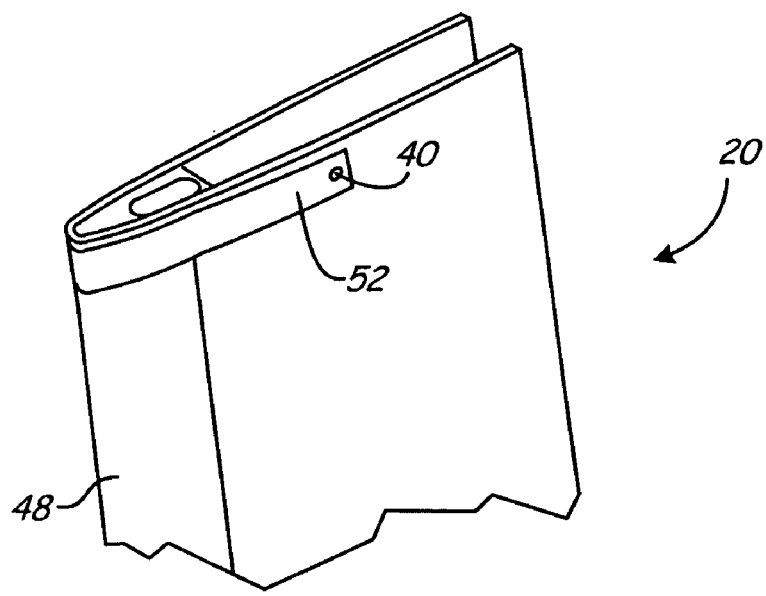
FIG. 3B is a detailed view of a second ply of a composite fairing.

FIGS. 3A and 3B illustrate two different fairing plies near the outer end 30 of one exemplary embodiment of a composite fairing with embedded heating elements. While these figures show the components of the composite fairing 20 on only one side, exemplary embodiments will have the illustrated components on each of the downstream sides 24A, 24B of the fairing. FIG. 3A shows a run-back heating element 32, a socket 34, junctions 36, a busbar 38, and a plated through hole 40 on one fairing ply. In this illustration, the fairing ply depicted in FIG. 3A is the second innermost fairing ply. However, the run-back heating element 32, junctions 36, busbar 38, and plated through hole 40 may also be located on other plies of the composite fairing 20.

The run-back heating element 32 is depicted in FIG. 3A as a serpentine path with substantially right angles. This illustration depicts the general location of the heating elements and does not limit the geometries nor the size of the run-back heating element 32, but rather illustrates the general area the run-back heating element occupies. The shape and coverage of the run-back heating element 32 may vary depending on the type of engine, the location of the fairing within the engine inlet, and the ice protection necessary for the engine's intended use. When an electric current is provided to the run-back heating element 32, it heats the composite fairing 20 to prevent or reduce ice formation along the downstream sides 24A, 24B of the fairing. The run-back heating element 32 may be made of copper or other materials suitable for heating the composite fairing 20. The run-back heating element 32 is generally sprayed onto a fabric layer of the fairing ply during manufacture, but other suitable methods for providing the heating element onto a fairing ply may be used.

Electric current is provided to the composite fairing 20 by an external power source (not shown). The external power source is not part of the composite fairing, but is located proximate to the fairing. A socket 34 delivers electric current from the external power source to the composite fairing 20. In an exemplary embodiment, the socket 34 resides within the composite fairing and is in contact with each of the inner downstream sides 24A, 24B of the fairing. In FIG. 3A, the socket 34 is located within the body of the composite fairing towards the upstream and outer ends of the fairing. Other locations and configurations for the socket are possible, but the socket or other means for delivering electric current is generally enclosed by the composite fairing body. Junctions 36 are located within the composite fairing 20. These junctions 36 provide a path for conducting electric current from the socket 34 to various elements of the composite fairing. The junctions 36 may traverse multiple plies of the composite fairing 20 to reach the socket 34. In the embodiment described in FIG. 3A, the junctions 36 are located on the second innermost fairing ply and also extend through the innermost fairing ply to reach the socket 34. The junctions 36 may traverse more than one fairing ply to connect the socket 34 to the elements of the composite fairing, however.

Figure 3C:
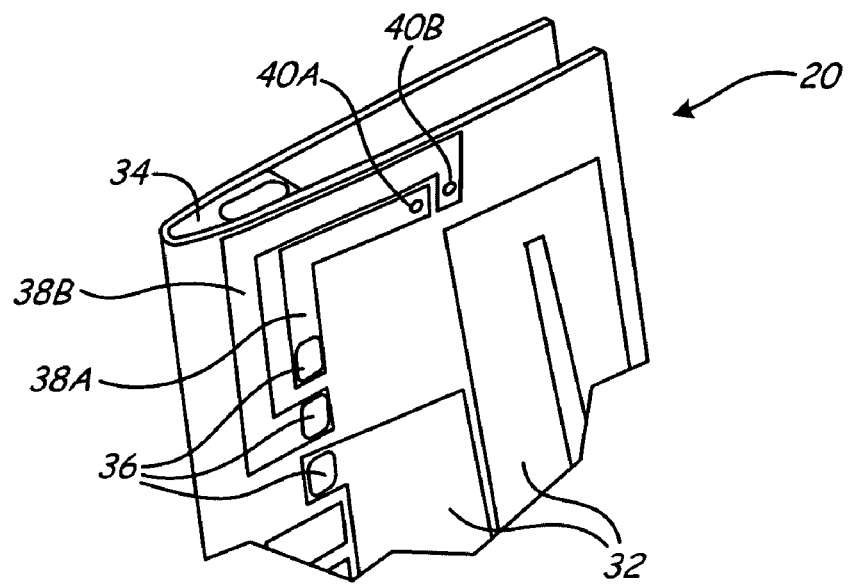
FIG. 3C is a detailed view of one ply of the composite fairing of FIG. 2.
Figure 3D:
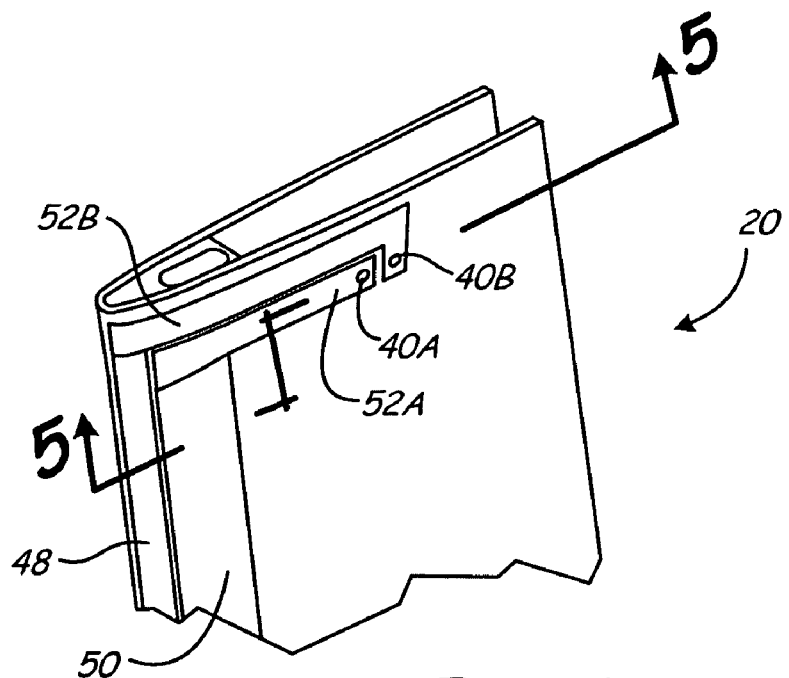
FIG. 3D is a detailed view of a second ply of the composite fairing of FIG. 2.
Figure 6:
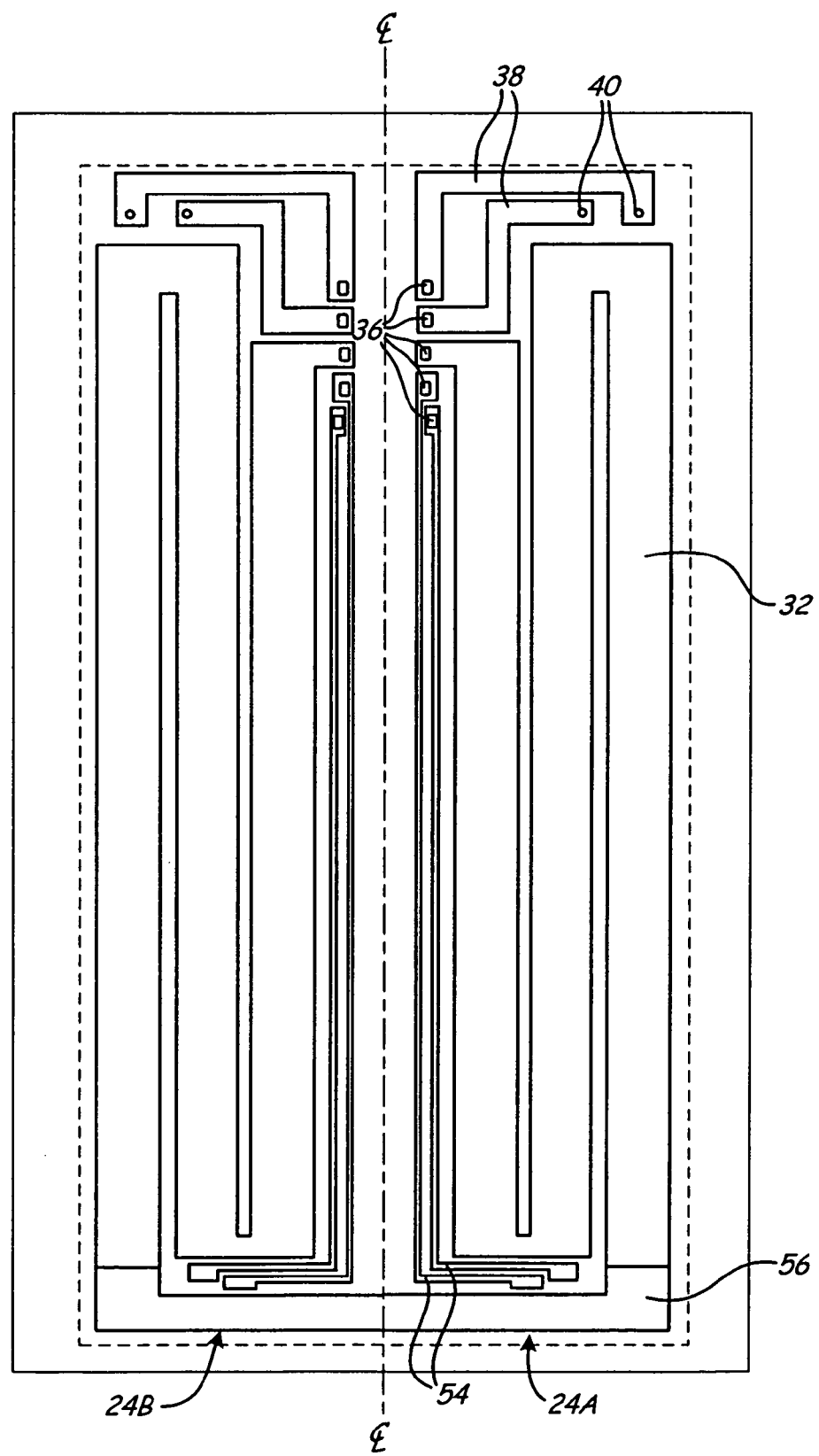
FIG. 6 is a planar view of a fairing ply with a run-back heating element.

While FIG. 3A depicts three junctions 36 between the socket 34 and the composite fairing 20, the present invention is not limited to this number of junctions. For example, FIG. 6 depicts five junctions 36. Greater and lesser numbers of junctions 36 may also be suitable in the present invention depending on the number of components in the composite fairing that require electric current to function. According to FIG. 3A, one junction 36 is connected to the run-back heating element 32 and conducts electric current from the socket 34 to the run-back heating element 32. In embodiments where the run-back heating element 32 is not connected directly to a junction 36, a busbar may be used to connect the run-back heating element to the junction 36. One junction 36 located towards the outer end of the composite fairing conducts electric current from the socket 34 to a busbar 38. The busbar 38 conducts the electric current to a plated through hole 40. While FIG. 3A depicts a single plated through hole 40 and a single corresponding busbar 38, the present invention is not limited to this number of plated through holes and busbars. As illustrated in FIGS. 3C and 3D, additional plated through holes 40 may be used to provide electric current to additional elements or other plies of the composite fairing 20. One or more junctions 36 may also travel towards the inner end 28 of the composite fairing 20 and conduct electric current from the socket 34 to one or more sensors (not shown).

As FIG. 3A illustrates, a busbar 38 is located on the same ply as the run-back heating element 32. The busbar 38 conducts electric current from a junction 36 to the plated through hole 40. The busbar 38 may be made of copper or other materials suitable for conducting electric current within the composite fairing 20. The busbar 38 may be sprayed onto a fabric layer of the fairing ply during manufacture; other suitable methods for providing busbars onto a fairing ply may also be used. The busbar 38 travels from a junction 36 towards the outer end 30 of the composite fairing 20 and then turns ninety degrees and travels towards the downstream end 26 of the composite fairing until it reaches plated through hole 40. The busbar 38 is configured in this fashion to connect junction 36 and plated through hole 40 while permitting as much surface area as possible on the fairing ply for the run-back heating element 32. Other configurations and busbar paths are also possible, such as a straight linear path from a junction 36 to the plated through hole 40, but exemplary embodiments will provide for space on the fairing ply for a large and uninterrupted area for the run-back heating element 32. A network of busbars 38 and plated through holes 40 serve to provide a complete circuit between the socket 34 and the various components of the composite fairing that require electric current.

As FIG. 3A further illustrates, a plated through hole 40 is also located on the same ply as the junctions 36 and the run-back heating element 32. To provide as much room as possible for the run-back heating element 32, in an exemplary embodiment the plated through hole 40 is located near the outer end 30 of the composite fairing 20. The plated through hole 40 may be located in other appropriate areas of the composite fairing 20, as well. The plated through hole 40 generally traverses all of the plies of the composite fairing 20. Since the plated through hole 40 generally occupies each ply, electric current may be delivered to each fairing ply via the plated through hole. A through hole 40 is generally drilled once the entire composite fairing 20 has been assembled. The hole may be potted with silicone following plating to prevent surface dimpling. The through hole is generally plated with copper by electroplating, although other suitable conductive materials, such as non-copper metal elements or brass, may also be used.

FIG. 3B illustrates a fairing ply with an anti-ice heating element 48, a busbar 52, and a plated through hole 40. In this illustration, the fairing ply depicted in FIG. 3B is the outermost fairing ply, not including any silicone erosion coating that may be applied. However, the anti-ice heating element 48, busbar 52, and plated through hole 40 may also be located on other plies of the composite fairing 20. The anti-ice heating element 48 is generally located near the upstream end 22 of the composite fairing 20. FIG. 3B depicts the general location of the heating element and does not limit the geometry nor the size of the anti-ice heating element 48, but rather illustrates the general area the anti-ice heating element occupies. When an electric current is provided to the anti-ice heating element 48, it heats the composite fairing 20 to prevent or reduce ice formation along the upstream sides 22 of the fairing. The anti-ice heating element 48 may be made of copper or other materials suitable for heating the composite fairing 20. The anti-ice heating element 48 is generally sprayed onto a fabric layer of the fairing ply during manufacture, but other suitable methods for providing the heating element onto a fairing ply may be used.

A busbar 52 connects the anti-ice heating element 48 to the plated through hole 40. Electric current is conducted to the anti-ice heating element 48 by the plated through hole 40 and busbar 52. To reach these heating elements, electric current travels from the socket 34 to the junctions 36 to the busbar 38 on the more inward fairing ply to the plated through hole 40 to the busbar 52 on the outer fairing ply to the anti-ice heating element 48.

As FIG. 3B illustrates, the anti-ice heating element 48 is positioned at the upstream end of downstream side 24A of the fairing ply. This is in contrast to the location of the run-back heating element 32, which is positioned farther downstream on the downstream side 24A, as shown in FIG. 3A. This configuration allows the anti-ice heating element 48 to heat the upstream end of downstream side 24A and the run-back heating element to heat the downstream end of downstream side 24A. The two heating elements, while on different fairing plies, cover different zones of the fairing to provide for ice protection coverage across substantially all of the external surface of the composite fairing. The anti-ice heating element 48 provides ice protection in the area of the composite fairing in which the run-back heating element does not. The heating elements are located in the axially central region of the fairing because ice protection in this area is most important. Ice protection at the inner end 28 and outer end 30 of the fairing is not as critical for acceptable engine performance.

In exemplary embodiments, at least about seventy percent of the external surface of the composite fairing will have ice protection coverage. Ice protection coverage at the external surface of the fairing is provided by the heating elements in the various plies of the composite fairing. In even more exemplary embodiments, at least about eighty percent of the external surface of the composite fairing will have ice protection coverage.

While FIGS. 3A and 3B illustrate an embodiment of a composite fairing with a single plated through hole and two heating elements, other configurations are possible. FIGS. 3C and 3D illustrate various fairing plies near the outer end 30 of another exemplary embodiment of a composite fairing with embedded heating elements. The embodiment shown in FIGS. 3C and 3D has two plated through holes 40A, 40B and three separate heating elements. FIG. 3C shows two junctions 36 connecting socket 34 to two busbars 38A, 38B. Busbar 38A travels from a junction 36 towards the outer end 30 of the composite fairing 20 and then turns ninety degrees and travels towards the downstream end 26 of the composite fairing until it reaches plated through hole 40A. Busbar 38B travels upstream, turns ninety degrees and travels towards the outer end 30 of the fairing, and then turns ninety degrees and travels towards the downstream end 26 of the fairing until it reaches a plated through hole 40B. Other configurations and busbar paths are also possible, such as straight linear paths from junctions 36 to the plated through holes 40, but exemplary embodiments will provide for space on the fairing ply for a large and uninterrupted area for the run-back heating element 32. A network of busbars 38 and plated through holes 40 serve to provide a complete circuit between the socket 34 and the various components of the composite fairing that require electric current.

FIG. 3D illustrates anti-ice heating element 48 and de-ice heating element 50. The de-ice heating element 50 is generally located near the upstream end 22 of the composite fairing 20 but downstream of the anti-ice heating element 48. FIG. 3D depicts the general locations of the heating elements and does not limit the geometry nor the size of the de-ice heating element 50, but rather illustrates the general areas the anti-ice and de-ice heating elements occupy. When an electric current is provided to the de-ice heating element 50, it heats the composite fairing 20 to prevent or reduce ice formation along the sides of the fairing near the upstream end 22. The de-ice heating element 50 may be made of copper or other materials suitable for heating the composite fairing 20. The de-ice heating element 50 is generally sprayed onto a fabric layer of the fairing ply during manufacture, but other suitable methods for providing the heating element onto a fairing ply may be used.

Also, according to FIG. 3D, busbar 52A connects plated through hole 40A to the de-ice heating element 50. Busbar 52B connects plated through hole 40B to the anti-ice heating elements 48. Electric current is conducted to the anti-ice heating elements 48 and the de-ice heating elements 50 by the plated through holes 40 and busbars 52. To reach these heating elements, electric current travels from the socket 34 to the junctions 36 to the busbars 38 on the more inward fairing ply to the plated through holes 40 to the busbars 52 on the outer fairing ply to the anti-ice and de-ice heating elements 48, 50.

As FIG. 3D illustrates, the anti-ice heating element 48 and de-ice heating element 50 are positioned at the upstream end of downstream side 24A of the fairing ply. This is in contrast to the location of the run-back heating element 32, which is positioned farther downstream on the downstream side 24A, as shown in FIG. 3C. This configuration allows the anti-ice heating element 48 and de-ice heating element 50 to heat the upstream end of downstream side 24A and the run-back heating element to heat the downstream end of downstream side 24A. The three heating elements, while on two different fairing plies, span multiple areas of the fairing to provide for ice protection coverage across substantially all of the composite fairing. The anti-ice heating element 48 and de-ice heating element 50 provide ice protection in the areas of the composite fairing in which the run-back heating element does not.

Figure 5:
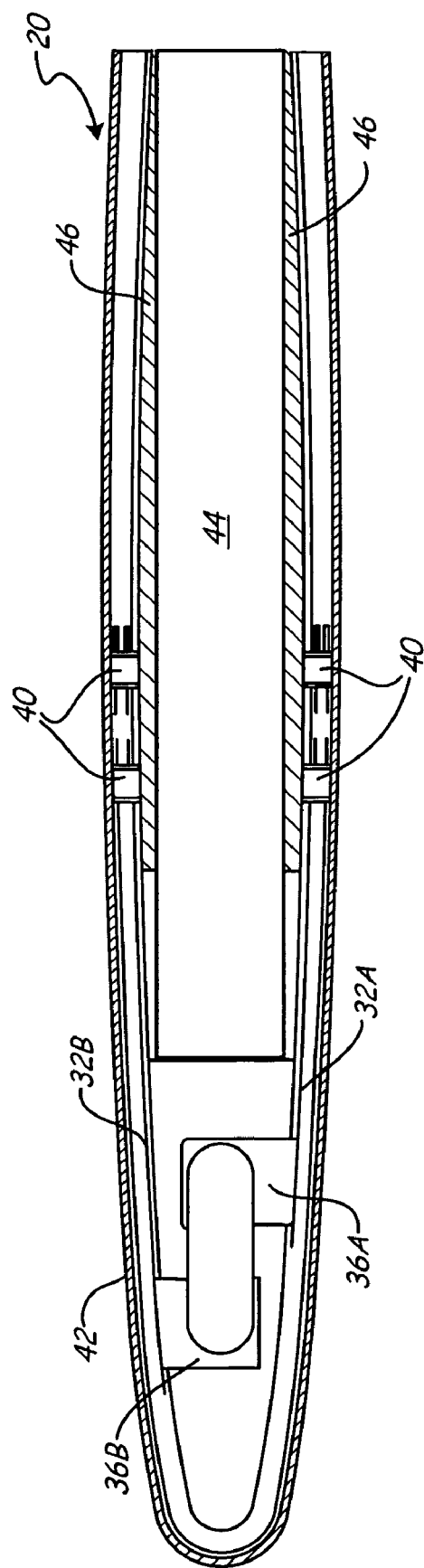
FIG. 5 is another cross section view of a composite fairing in accordance with one embodiment of the present invention.

In an exemplary embodiment, through holes drilled into the composite fairing have a diameter of about 0.09 inches (2.3 mm) and the plating layer has a thickness of about 0.007 inches (0.18 mm). The composite fairing is electrically insulated from other engine inlet components by insulating materials such as silicone. In an exemplary embodiment, a silicone erosion coating 42 is applied to the outer surface of the composite fairing (FIG. 5). This coating covers the entire outer surface of the composite fairing, including the plated through holes 40, and is about 0.01 inches (0.25 mm) thick. Additionally, silicone material is used to bond the inner surface of the composite fairing 20 to the inner strut 44 it engages. In an exemplary embodiment, the silicone bond layer 46 between the fairing 20 and inner strut 44 is about 0.015 inches (0.38 mm) thick. The silicone bond 46 traverses a substantial area where the composite fairing 20 and inner strut 44 engage as shown in FIG. 5. Together, the silicone coating 42 and silicone bond 46 electrically isolate the composite fairing from other engine inlet components.

Figure 4:
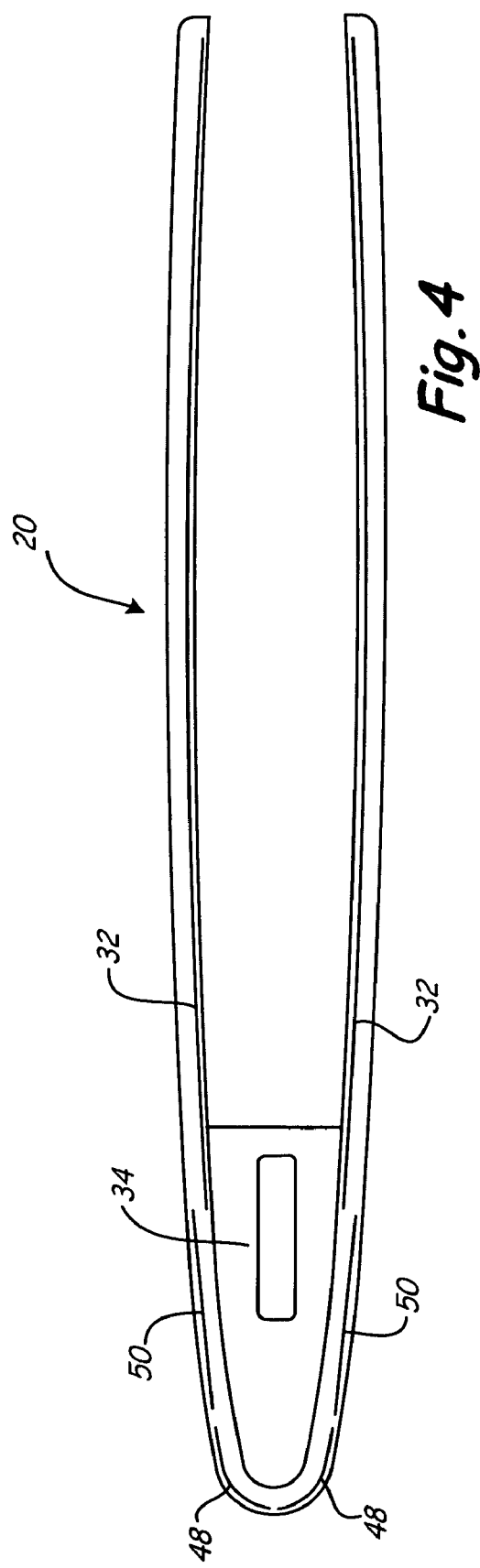
FIG. 4 is a cross section view of a composite fairing in accordance with one embodiment of the present invention.

FIGS. 4 and 5 show cross sections of a composite fairing 20. FIG. 4 illustrates a cross section of an embodiment with three heating elements 32, 48, 50. FIG. 5 shows a cross section of the embodiment illustrated in FIGS. 3C and 3D. FIG. 4 illustrates the general configurations of the anti-ice 48 and de-ice 50 heating elements, the socket 34, and the run-back heating element 32. As discussed above, the anti-ice 48 and de-ice 50 heating elements are located on the inside of the outermost ply and towards the upstream end 22 of the composite fairing, while the run-back heating element 32 is located on the inside of the second innermost ply and downstream from the anti-ice 48 and de-ice 50 heating elements. FIG. 5 shows a more detailed cross section with respect to the socket 34, run-back heating element 32, and plated through holes 40. FIG. 5 also shows the inner strut 44 to which the composite fairing 20 is bonded. In this embodiment, the socket 34 connects to one run-back heating element 32A farther downstream than run-back heating element 32B via junctions 36A, 36B. In such a configuration, the anti-ice and de-ice heating elements (not shown) would extend farther downstream to provide additional downstream ice protection coverage for the downstream side 24A having run-back heating element 32A.

Figure 7:
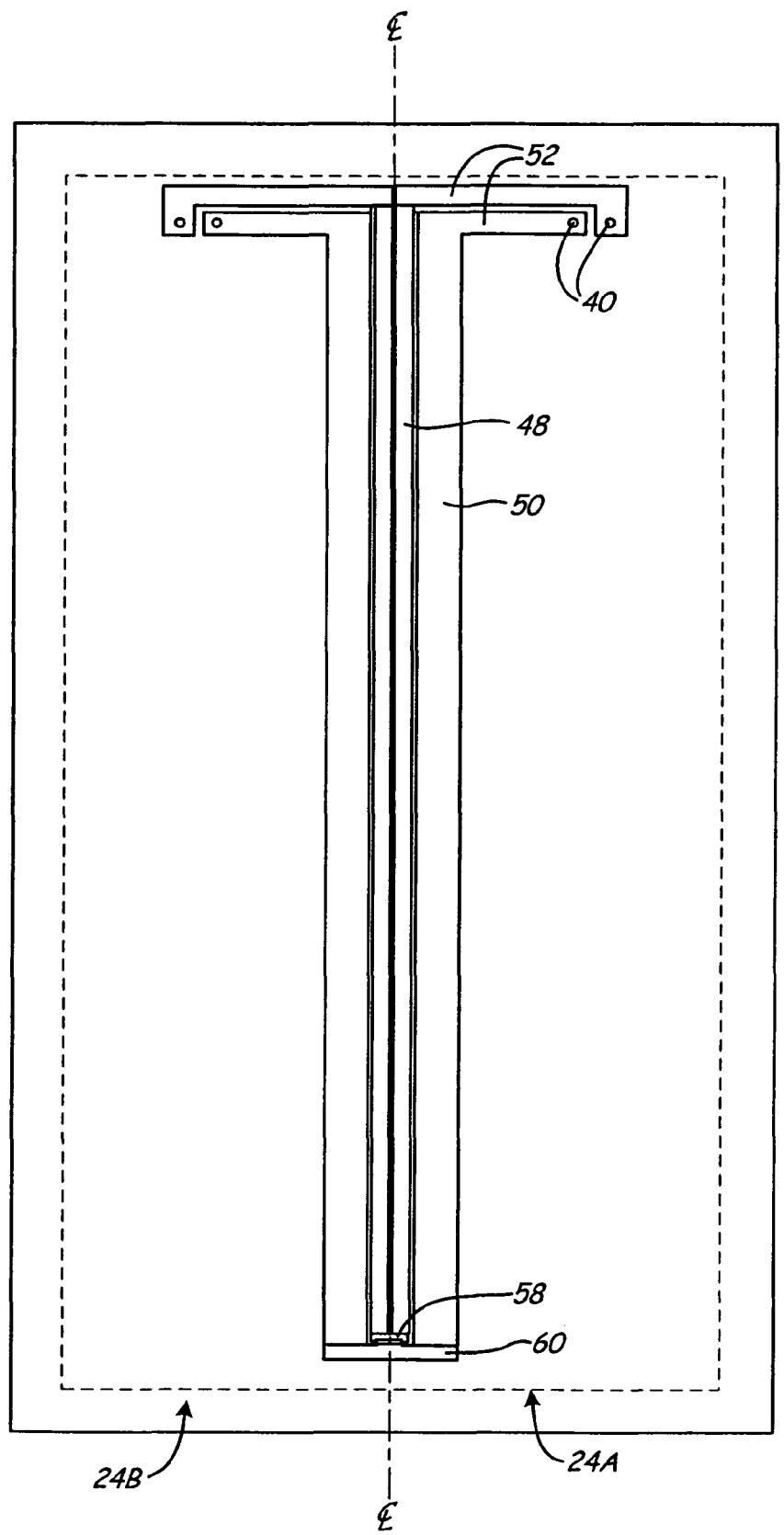
FIG. 7 is a planar view of a fairing ply with anti-ice and de-ice heating elements.

FIGS. 6 and 7 show planar views of different fairing plies of one embodiment of a composite fairing. These figures show the schematics and general configuration of the fairing plies in an unbent and flat form. The fairings depicted are bent along the centerline co-molded with other fairing plies to form the completed composite fairing. FIG. 6 shows a fairing ply containing junctions 36, busbars 38, sensor busbars 54, plated through holes 40, run-back heating element 32, and return busbar 56. The two sides of a fairing ply 24A, 24B are not necessarily mirror images. As discussed above and illustrated in FIG. 5, in some embodiments, the run-back heating element 32 on one downstream side 24 of the fairing may connect to the socket 34 farther downstream than the run-back heating element on the other downstream side 24. Thus, the location of the junctions 36, busbars 38, run-back heating elements 32, and the general paths traversed by the components may differ from one side to the other. Return busbar 56 connects the run-back heating elements 32 of downstream sides 24A and 24B. Return busbar 56 functions to complete the circuit that includes the run-back heating element 32. For example, electric current travels from the socket 34 on downstream side 24A, to a junction 36, through run-back heating element 32, across the return busbar 56 spanning downstream sides 24A and 24B, to the run-back heating element 32 on downstream side 24B, through a junction 36 and back to the socket 34.

FIG. 7 shows a fairing ply containing the anti-ice 48 and de-ice 50 heating elements, busbars 52, plated through holes 40, and return busbars 58 and 60. The two sides of a fairing ply 24A, 24B are not necessarily mirror images. As discussed above and illustrated in FIG. 5, in some embodiments, the run-back heating element 32 on one downstream side 24 of the fairing may connect to the socket 34 farther downstream than the run-back heating element on the other downstream side 24. In this case, the anti-ice 48 and de-ice 50 heating elements may extend farther downstream to provide ice protection coverage where the run-back heating element 32 does not. Thus, the location of the busbars 52, anti-ice heating element 48, and de-ice 50 heating element and the general paths traversed by the components may differ from one side to the other. Return busbars 58 and 60 respectively connect the anti-ice heating elements 48 and the de-ice heating elements 50 of downstream sides 24A and 24B. Return busbars 58 and 60 function to complete the respective circuits that include the anti-ice heating element 48 and the de-ice heating element 50. For example, electric current travels from the socket 34 on downstream side 24A, to a junction 36, to a busbar 38, to plated through hole 40, to busbar 52, through anti-ice heating element 48, across the return busbar 58 spanning downstream sides 24A and 24B, to the anti-ice heating element 48 on downstream side 24B, to busbar 52, and so on back to the socket 34 on downstream side 24B.

In some exemplary embodiments of the present invention, the composite fairing may also include sensors such as those used for determining temperature. Temperature sensors, such as devices that determine temperature based on measured resistance, may be present in various plies of the composite fairing. FIG. 6 illustrates a fairing ply having sensor busbars 54 connected to junctions 36. In this embodiment, the sensor busbars 54 traverse the fairing ply from the junctions 36 to an area near the radially inward end (inner end 28) of the fairing ply. The ends of the sensor busbars 54 connect to sensors (not shown) on different plies of the composite fairing. These connections can be made by junctions extending through multiple fairing plies or by use of plated through holes, discussed in detail above.

The present invention also provides for a method of making a composite fairing having the heating architecture described above. The composite fairing includes a plurality of individual fairing plies bonded together. Heating elements and other fairing components are added to or deposited on the individual fairing plies. In one method of forming a composite fairing, a layer of thermoset adhesive is applied to a ply of high-density material that forms a fabric layer. Heating elements 32, 48, 50 are then positioned on the layers of thermoset adhesive and positioned with respect to one another as desired. High-temperature resin is then injected into the material, thereby impregnating the material with the resin and forming a fabric layer. The resin and thermoset adhesive are then cured, and as a result, the heating elements adhere to the fabric layer after the curing step to form a fairing ply. A more complete description of the method of forming a fairing ply with embedded heating elements can be found in U.S. Patent Publication No. 2007/0187381, assigned to United Technologies Corporation. Busbars and other components of the fairing plies may be introduced into a fairing ply in similar fashion.

Once the individual fairing plies have been formed they are bent or shaped to the desired configuration. Once shaped, the fairing plies are bonded together to form the composite fairing 20. The through holes are then drilled in the desired location or locations and the through holes are then electroplated as described above. Optionally, the through holes are potted with silicone after they are electroplated. An insulating silicone coating is then applied to the outer surface of the composite fairing 20. The composite fairing 20 is then bonded to an engine inlet inner strut 44 with silicone materials, as described above.

Although the present invention has been described with reference to exemplary embodiments, workers skilled in the art will recognize that changes may be made in form and detail without departing from the spirit and scope of the invention.

The invention claimed is:

1. A composite fairing with ice protection having a plurality of plies comprising:
   a first heating element configured to heat a first zone upon application of an electric current across the first heating element;
   a second heating element configured to heat a second zone upon application of an electric current across the second heating element;
   a plurality of junctions connecting a socket to a plurality of first busbars, wherein the junctions and first busbars are configured to conduct electricity to the first heating element and to a plated through hole;
   a plated through hole extending through all composite fairing plies, wherein the plated through hole is configured to conduct electric current to a second busbar; and
   a second busbar connecting the plated through hole to the second heating element, wherein the second busbar is configured to conduct electric current from the plated through hole to the second heating element.

2. The composite fairing of claim 1, further comprising:
   a third heating element configured to heat a third zone upon application of an electric current across the third heating element;
   a second plated through hole extending through all composite fairing plies, wherein the second plated through hole is configured to conduct electric current to a third busbar; and
   a third busbar connecting the second plated through hole to the third heating element, wherein the third busbar is configured to conduct electric current from the second plated through hole to the third heating element.

3. The composite fairing of claim 1, wherein the first heating element and the second heating element are located on different plies of the composite fairing.

4. The composite fairing of claim 3, wherein the second heating element and the second busbar are located on an inner surface of an outermost fairing ply and the first heating element, the junctions, and at least one of the plurality of first busbars are located on an inner surface of a fairing ply adjacent an innermost fairing ply.

5. The composite fairing of claim 1, wherein the plated through hole is located downstream of the junctions and radially outward relative to at least one of the heating elements.

6. The composite fairing of claim 5, wherein at least one of the first busbars does not traverse the fairing in a downstream direction until the at least one of the first busbars is radially outward relative to the first heating element.

7. The composite fairing of claim 1, further comprising:
   a sensor for determining temperature; and
   a sensor busbar connecting the sensor and a junction, wherein the sensor busbar is configured to conduct electric current to the sensor.

8. The composite fairing of claim 7, wherein an end of the sensor busbar is located axially inward relative to the first heating element.

9. The composite fairing of claim 1, wherein the composite fairing has first and second fairing sides extending downstream, and wherein each fairing side comprises:
   a first heating element configured to heat a first zone upon application of an electric current across the first heating element;
   a second heating element configured to heat a second zone upon application of an electric current across the second heating element;
   a plurality of junctions connecting a socket to a plurality of first busbars, wherein the junctions and first busbars are configured to conduct electricity to the first heating element and to a plated through hole;
   a plated through hole extending through all composite fairing plies, wherein the plated through hole is configured to conduct electric current to a second busbar; and
   a second busbar connecting the plated through hole to the second heating element, wherein the second busbar is configured to conduct electric current from the plated through hole to the second heating element.

10. The composite fairing of claim 9, wherein the junctions of the first fairing side are located farther upstream than the junctions of the second fairing side.

11. The composite fairing of claim 1, wherein the composite fairing comprises between about eight and about twelve fairing plies.

12. The composite fairing of claim 9, wherein the first and second heating elements are positioned so that the first and second zones heated by the first and second heating elements cover at least about seventy percent of the composite fairing.

13. The composite fairing of claim 9, wherein the first and second heating elements are positioned so that the first and second zones heated by the first and second heating elements cover at least about eighty percent of the composite fairing.

14. A composite fairing with ice protection having a plurality of plies comprising:
- a first heating element configured to heat a downstream zone upon application of an electric current across the first heating element;
- a second heating element configured to heat a first upstream zone upon application of an electric current across the second heating element;
- a third heating element configured to heat a second upstream zone upon application of an electric current across the third heating element;
- a plurality of junctions connecting a socket to a plurality of first busbars, wherein the junctions and first busbars are configured to conduct electricity to the first heating element and to plated through holes;
- first and second plated through holes extending through all composite fairing plies, wherein the first plated through hole is configured to conduct electric current to a second busbar and the second plated through hole is configured to conduct electric current to a third busbar;
- a second busbar connecting the first plated through hole to the second heating element, wherein the second busbar is configured to conduct electric current to the second heating element; and
- a third busbar connecting the second plated through hole to the third heating element, wherein the third busbar is configured to conduct electric current to the third heating element.

15. The composite fairing of claim 14, wherein the second and third heating elements and the second and third busbars are located on an inner surface of an outermost fairing ply and the first heating element, the junctions, and at least one of the plurality of first busbars are located on an inner surface of a fairing ply adjacent an innermost fairing ply.

16. The composite fairing of claim 14, wherein the composite fairing has first and second downstream sides, and wherein the first and second downstream sides each comprises:
- a first heating element configured to heat a downstream zone upon application of an electric current across the first heating element;
- a second heating element configured to heat a first upstream zone upon application of an electric current across the second heating element;
- a third heating element configured to heat a second upstream zone upon application of an electric current across the third heating element;
- a plurality of junctions connecting a socket to a plurality of first busbars, wherein the junctions and first busbars are configured to conduct electricity to the first heating element and to plated through holes;
- first and second plated through holes extending through all composite fairing plies, wherein the first plated through hole is configured to conduct electric current to a second busbar and the second plated through hole is configured to conduct electric current to a third busbar;
- a second busbar connecting the first plated through hole to the second heating element, wherein the second busbar is configured to conduct electric current to the second heating element; and
- a third busbar connecting the second plated through hole to the third heating element, wherein the third busbar is configured to conduct electric current to the third heating element.

17. A composite fairing with ice protection having a plurality of plies comprising:
- a first ply having an inner surface comprising:
  - a first heating element configured to heat a first zone upon application of an electric current across the first heating element;
  - a plurality of junctions connecting a socket to a plurality of first busbars, wherein the junctions and first busbars are configured to conduct electric current to the first heating element and to a plated through hole;
  - a plated through hole, wherein the plated through hole is configured to conduct electric current to other plies of the fairing; and
- a second ply having an inner surface comprising:
  - a second heating element configured to heat a second zone upon application of an electric current across the second heating element;
  - the plated through hole of the first ply, wherein the plated through hole is configured to conduct electric current; and
  - a second busbar connecting the plated through hole to the second heating element, wherein the second busbar is configured to conduct electric current to the second heating element.

18. The composite fairing of claim 17, wherein the first ply is adjacent to an innermost ply of the fairing and the second ply is an outermost ply of the fairing.

19. A method of making a composite fairing with embedded heating elements and having ice protection, the method comprising:
- depositing a first heating element configured to heat a first zone onto an inner surface of a first fairing ply;
- providing a plurality of junctions on an inner surface of the first fairing ply connecting a socket to a plurality of first busbars,
- providing a plurality of first busbars, wherein the junctions and first busbars are configured to conduct electric current to the first heating element and to a plated through hole area;
- depositing a second heating element configured to heat a second zone onto an inner surface of a second fairing ply;
- providing a second busbar on the inner surface of the second ply connecting the plated through hole area to the second heating element for conducting electric current to the second heating element;
- shaping the first and second fairing plies and additional fairing plies of the composite fairing;
- co-molding adjacent plies to form the composite fairing;
- drilling at least one through hole in the plated through hole area extending through the composite fairing;
- electro-plating the at least one through hole to form a plated through hole configured to conduct electric current to all fairing plies of the composite fairing.

20. The method of claim 19, wherein the at least one though hole is potted with silicone after the electro-plating.

* * * * *